(12) United States Patent
Lee

(10) Patent No.: US 8,480,075 B2
(45) Date of Patent: Jul. 9, 2013

(54) IMAGE FORMING APPARATUS

(75) Inventor: Byung Jun Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 776 days.

(21) Appl. No.: 12/632,039

(22) Filed: Dec. 7, 2009

(65) Prior Publication Data

US 2010/0157390 A1    Jun. 24, 2010

(30) Foreign Application Priority Data

Dec. 19, 2008   (KR) .......................... 10-2008-129823

(51) Int. Cl.
*B65H 3/06* (2006.01)

(52) U.S. Cl.
USPC ........................................................ 271/118

(58) Field of Classification Search
USPC ........................................................ 271/118
See application file for complete search history.

(56) References Cited

U.S. PATENT DOCUMENTS

| | | | | |
|---|---|---|---|---|
| 3,265,384 A * | 8/1966 | Shute | ............................. | 271/110 |
| 3,815,900 A * | 6/1974 | Schulze | ......................... | 271/118 |
| 4,319,740 A * | 3/1982 | Ulseth | .............................. | 271/22 |
| 4,717,139 A * | 1/1988 | Sootome et al. | .............. | 271/116 |
| 7,481,422 B2 * | 1/2009 | Lim | .................................. | 271/118 |

FOREIGN PATENT DOCUMENTS

JP          11-059928          3/1999

* cited by examiner

*Primary Examiner* — David H Bollinger

(74) *Attorney, Agent, or Firm* — Stanzione & Kim, LLP

(57) ABSTRACT

An image forming apparatus having a pickup roller rotated to pick up a printing medium. The image forming apparatus includes support members operated in connection with the rotation of the pickup roller, and the pickup of the printing medium is carried out under the condition that both sides of the printing medium are supported by the support members. The image forming apparatus thereby prevents jams generated in the process of picking up a deformed printing medium.

20 Claims, 8 Drawing Sheets

IMAGE FORMING APPARATUS

CROSS-REFERENCE TO RELATED APPLICATIONS

This application claims priority under 35 U.S.C. §119(a) from Korean Patent Application No. 2008-0129823, filed on Dec. 19, 2008 in the Korean Intellectual Property Office, the disclosure of which is incorporated herein by reference in its entirety.

BACKGROUND

1. Field of the Invention

The present general inventive concept relates to an image forming apparatus having a structure that prevents the generation of jams in the process of picking up a printing medium.

2. Description of the Related Art

Image forming apparatuses are apparatuses that form an image on a printing medium, such as paper, according to an input image signal, and correspond to a printer, a copier, a fax machine, and a multi-function peripheral combining some or all of these functions.

An image forming apparatus includes a main body forming the external appearance of the image forming apparatus, a print media storage unit to store a plurality of sheets of paper, a developing unit to form a visible image on the paper through a developer, a pickup unit having a pickup roller to pick up the paper of the print media storage unit to supply the paper in the print medial storage unit to the developing unit, a fusing unit to fuse the developer on the paper to the paper, and an exit unit to discharge the paper, on which image formation has been completed, to the outside of the main body.

Light is irradiated onto a photo conductor of the developing unit discharged with a designated electric potential to form an electrostatic latent image on the surface of the photo conductor, and the electrostatic latent image is developed into a visible image by supplying the developer to the electrostatic latent image formed on the photo conductor. The visible image on the photo conductor is transferred to the sheets of the paper supplied from the print media storage unit by the pickup unit, and the visible image transferred to the sheets of the paper is fused to the sheets of the paper through the fusing unit to complete image formation on the sheets of the paper. After the image formation on the sheets of the paper has been completed, the sheets of the paper are discharged to the outside of the main body through the exit unit.

Paper that is generally used in the image forming apparatus contains some moisture imparted thereto during a paper manufacturing process. When this paper is not used for a long time under the condition that the paper is stored in the print media storage unit, moisture in the paper evaporates and thus causes deformation of the paper, such as curling of both sides of the paper.

If a sheet of the paper, both sides of which are curled up, is picked up by the pickup roller, the central portion of the sheet of the paper picked up by the pickup rollers is supported by the pickup roller and the sheet of the paper is easily picked up, but both sides of the sheet of the paper picked up by the pickup roller are jammed by a guide roller to guide the movement of the paper, thus causing a paper jam.

SUMMARY

The present general inventive concept provides a pickup unit that prevents the generation of jams due to both sides of a printing medium being deformed in the process of picking up the printing medium, and an image forming apparatus having the same.

Additional features and utilities of the present general inventive concept will be set forth in part in the description which follows and, in part, will be obvious from the description, or may be learned by practice of the general inventive concept.

Exemplary embodiments of the present general inventive concept may be achieved by providing an image forming apparatus which may include a pickup roller rotated to pick up a printing medium, and support members operated in connection with the rotation of the pickup roller to support the printing medium picked up by the pickup roller.

The image forming apparatus may further include a pickup shaft to transmit a rotary force to the pickup roller, and interlocking cams installed on the pickup shaft, rotated together with the pickup shaft, to cause the support members to selectively support the printing medium according to the rotation angle of the interlocking cams.

The pickup roller may include a pickup part contacting the printing medium, and each of the interlocking cams may have a fan-shaped cross section, and a first cam plane forming the outer circumferential surface of each of the interlocking cams may be disposed at an angle corresponding to the pickup part.

Each of the support members may include a support part having an arc-shaped outer surface to support the upper surface of the printing medium, a second cam plane formed on another surface of the support part to interact with the first cam plane of each of the interlocking cams, and a hinge part provided at one end of each of the support members to allow each of the support members to be rotated around the hinge part.

The image forming apparatus may further include elastic members to respectively return the support members to an original position thereof.

The support members, the interlocking cams, and the elastic members may be respectively provided in a pair to support both sides of the printing medium.

Exemplary embodiments of the present general inventive concept may also be achieved by providing an image forming apparatus which may include a pickup unit to pick up a printing medium, and support units to selectively support the printing medium picked up by the pickup unit when the printing medium is picked up by the pickup unit.

The pickup unit may include a pickup roller rotated to pick up the printing medium, and a pickup shaft to transmit a rotary force to the pickup roller, and the support units may be operated by the rotary force transmitted through the pickup shaft.

Each of the support units may include an interlocking cam installed on the pickup shaft and rotated together with the pickup shaft, and a support member rotated around one end thereof to selectively support the printing medium according to the rotations angle of the interlocking cam.

Exemplary embodiments of the present general inventive concept may also be achieved by providing an image forming apparatus which may include a main body, a print media storage unit detachably installed in the main body to store printing medium, a pickup unit to pick up one sheet of the printing medium stored in the print media storage unit at a time, and support units, each of which includes a support member to support the printing medium, the support member being selectively protruded downward to support the printing medium at the time when the printing medium is picked up by the pickup unit.

Exemplary embodiments of the present general inventive concept may also be achieved by providing a support unit for use in an image forming apparatus having a pickup roller, which may include a support member to engage a printing medium and to apply a variable force to the printing medium according to a rotation angle of the pickup roller to prevent a jam of the printing medium.

The support unit may further include an interlocking cam to rotate with the pickup roller to apply the variable force to the support member according to the rotation, and wherein the member includes a support part to engage with edge portions of the printing medium.

The support member may have a first surface which contacts the interlocking cam and a second surface opposite the first surface to engage with the edges of the printing medium.

The support unit may further include a hinge part at one end of the support member to permit the support member to rotate about the hinge part, and an elastic member to bias the support member to return the support member to an original position thereof.

BRIEF DESCRIPTION OF THE DRAWINGS

These and/or other features and utilities of the present general inventive concept will become apparent and more readily appreciated from the following description of the embodiments, taken in conjunction with the accompanying drawings of which.

DETAILED DESCRIPTION OF THE EMBODIMENTS

Figure 1:
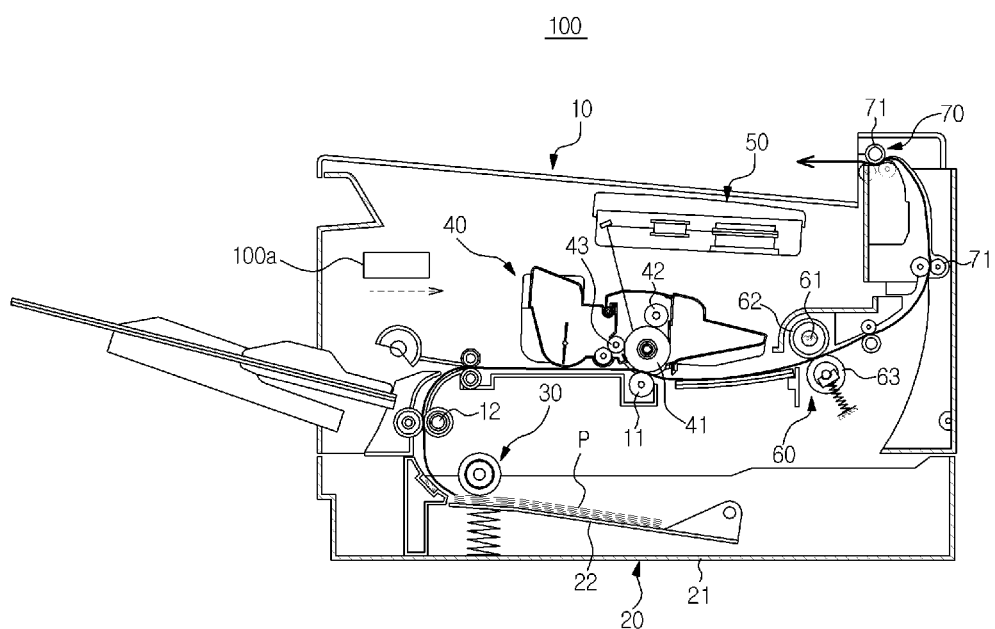
FIG. 1 is a perspective view illustrating the schematic configuration of an image forming apparatus in accordance with an exemplary embodiment of the present general inventive concept.

Reference will now be made in detail to the embodiments of the present general inventive concept, examples of which are illustrated in the accompanying drawings, wherein like reference numerals refer to the like elements throughout.

As illustrated in FIG. 1, an image forming apparatus 100 in accordance with an embodiment of the present invention includes a main body 10 forming the external appearance of the image forming apparatus 100, a print media storage unit 20 detachably installed in the main body 10 to store a printing medium P, a pickup unit 30 to pick up the printing medium P stored in the print media storage unit 20, a developing unit 40 to form a visible image on the printing medium P, supplied through the pickup unit 30, through a developer, an exposure unit 50 to form an electrostatic latent image on a photo conductor 41 of the developing unit 40, a fusing unit 60 to fuse the developer, transferred to the printing medium P, to the printing medium P, and an exit unit 70 to discharge the printing medium P, on which image formation has been completed, to the outside of the main body 10. The print media storage unit 20 supplies the printing medium P to the developing unit 40. The operations of the pickup unit 30, the developing unit 40, the exposure unit 50, the fusing unit 70, and the discharge unit 70 may be controller by a controller 100a.

Although FIG. 1 illustrates an image forming apparatus 100 using the developer unit 40, the exposure unit 50, and the fusing unit 60, as a printing unit, the present general inventive concept is not limited thereto. For example, the printing unit may also be an inkjet printing unit. It is also possible that the pickup unit 30 can be used in an inkjet image forming apparatus. Accordingly, the pickup unit 30 illustrated in FIGS. 1-5 can be used with an inkjet printing unit of the inkjet image forming apparatus.

The print media storage unit 20 includes a print media cassette 21 installed in the main body 10 in a drawer type such that the print media cassette 21 moves forward and backward, and a knock-up plate 22 installed in the print media cassette 21 to mount the printing medium P.

The developing unit 40 forms a visible image on the printing medium P, transmitted from the print media storage unit 20, through the developer. The developing unit 40 includes the photo conductor 41 having the surface, on which the electrostatic latent image is formed by the exposure unit 50, a charging roller 42 to charge the photo conductor 41, and a developing roller 43 to develop the electrostatic latent image formed on the photo conductor 41 into the visible image. A transfer roller 11 disposed opposite to the photo conductor 41 to support the printing medium P toward the photo conductor 41 to transfer the visible image formed on the photo conductor 41 to the printing medium P is installed in the main body 10.

The exposure unit 50 irradiates light including image data onto the photo conductor 41, and thus forms the electrostatic latent image on the photo conductor 41.

The fusing unit 60 fuses the image, formed on the printing medium P, to the printing medium P by applying heat and pressure to the printing medium P. The fusing unit 60 includes a heating roller 62 provided with a heater 61 installed therein, and a pressure roller 63 to press the printing medium P onto the heating roller 62. Therefore, the printing medium P passes through a gap between the heating roller 62 and the pressure roller 63 and receives heat and pressure, and thus the visible image formed on the printing medium P by the developer is fused to the printing medium P.

The exit unit 70 includes exit rollers 71 that are sequentially installed, and discharges the printing medium P, having passed through the fusing unit 60, to the outside of the main body 10.

Figure 2:
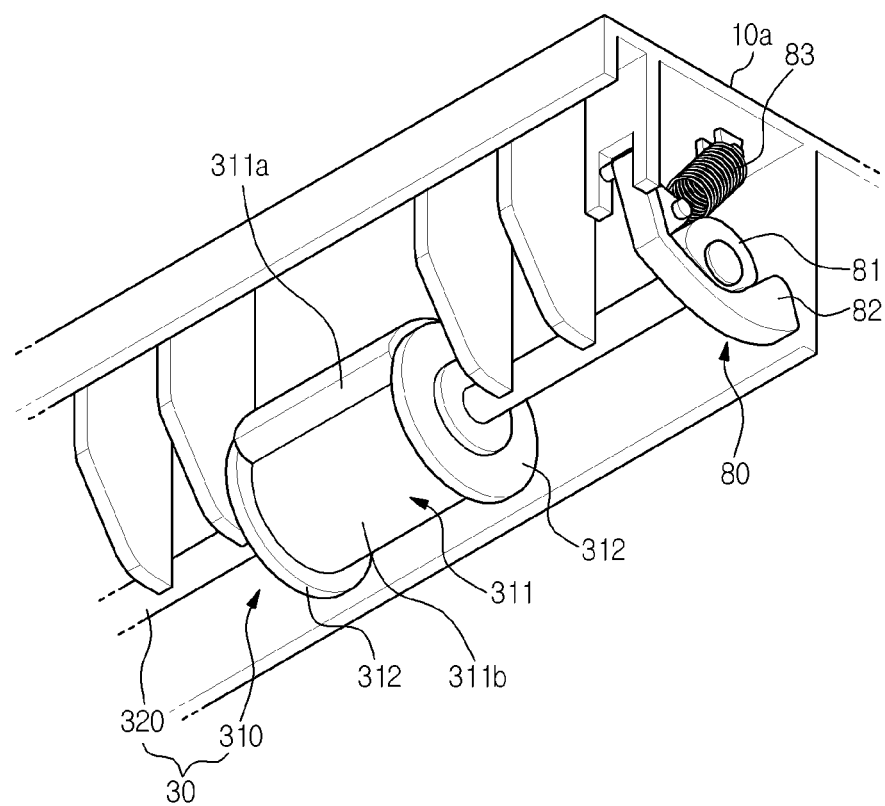
FIG. 2 is a perspective view illustrating the installation state of a pickup unit and a support unit applied to the image forming apparatus in accordance with an exemplary embodiment of the present general inventive concept.

The pickup unit 30, as illustrated in FIG. 2, picks up the uppermost sheet of the printing medium P stored in the print media storage unit 20, and transmits the sheet of the printing medium P to the developing unit 40. The pickup unit 30 includes a pickup roller 310 rotated to contact the printing medium P stored in the print media storage unit 20 and pick up the printing medium P, and a pickup shaft 320 transmitting rotary force to the pickup roller 310 to rotate the pickup roller 310. The pickup roller 310 includes a pickup rotating body 311 to pick up the printing medium P mounted on the knock-up plate 22, and a pair of idle rollers 312 rotatably installed at both sides of the pickup rotating body 311. A portion of the outer circumferential surface of the pickup rotating body 311 protrudes to the outside of the radial direction of the idle rollers 312, and thus forms a pickup part 311a contacting the printing medium P mounted on the knock-up plate 22, and another portion of the pickup rotating body 311 does not protrude beyond the radius of the idle rollers 312, forming a non-pickup part 311b. Therefore, after the pickup part 311a of the pickup rotating body 311 reaches a pickup position contacting the printing medium P mounted on the knock-up plate 22 according to the rotation of the pickup roller 310, the printing medium P is picked up by the friction between the pickup part 311a and the printing medium P and is fed to the developing unit 40. A feeding roller 12 (with reference to FIG. 1) to feed the printing medium P picked up by the pickup roller 310 to the developing unit 40 is installed in the main body 10.

Figure 6:
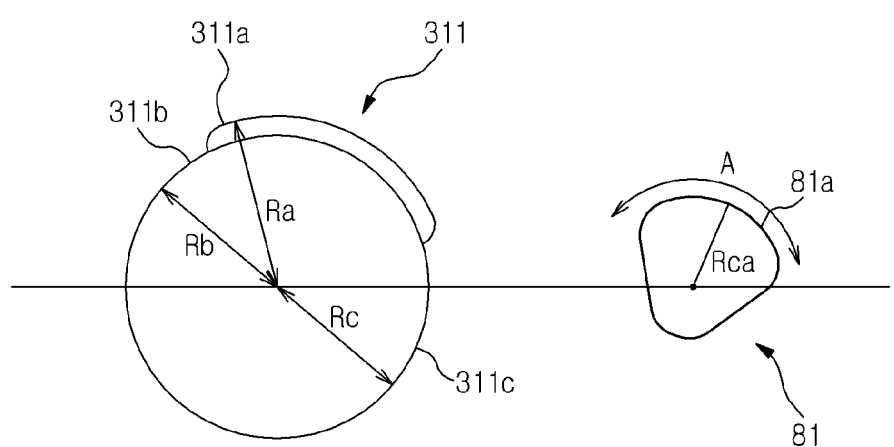
FIG. 6 illustrates a pickup rotating body and an interlocking cam in accordance with an exemplary embodiment of the present general inventive concept.
Figure 7A:
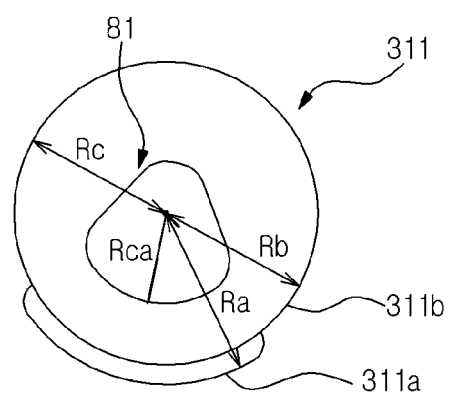
FIGS. 7a and 7b illustrate a pickup rotating body in accordance with an exemplary embodiment of the present general inventive concept.
Figure 7B:
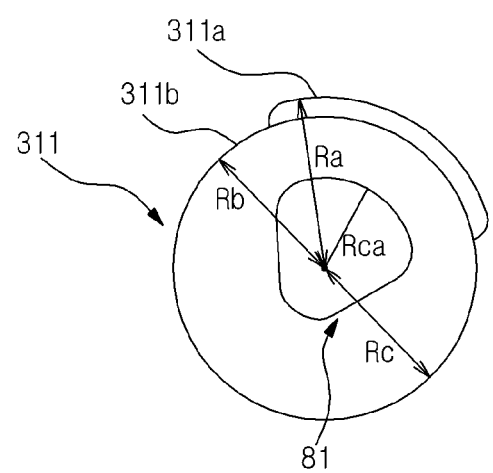

With reference to FIG. 6, the pickup part 311a of the pickup rotating body 311 protrudes outside the radial direction of the idle rollers 312. That is, the pickup part 311a has a radius Ra which is greater than the radius of the idle rollers 312. The non-pickup part 311b of the pickup rotating body 311 does not protrude outside the radius of the idle rollers, and thus has a radius of Rb which is less than the radius of the idle rollers 312. In addition, at the point where the radius of the pickup rotating body 311 is the same as the radius of the idle rollers 312, the pickup rotating body 311 has a surface 311c with a radius Rc.

The image forming apparatus 100 in accordance with an exemplary embodiment further includes support units 80 to support both sides of the printing medium P to prevent a jam from occurring when the printing medium P, which is deformed, i.e., both sides of which may be curled up, is picked up. In an exemplary embodiment, since both sides of the printing medium P may be deformed, as described above, a pair of support units 80 can be respectively disposed at both sides of the pickup roller 310 to support both sides of the printing medium P.

These support units 80 selectively support the printing medium P only when the printing medium P is picked up by the pickup roller 310. If the printing medium P is continuously supported by the support units 80, interference between the print media storage unit 20 and the support units 80 may be generated in the process of attaching and detaching the print media storage unit 20 to and from the main body 10. The interference may include friction generated between the support units 80 and the print media storage unit 20 which may, for example, prevent smooth detachment of the print media storage unit 20, or cause upper sheets of the printing medium P to be pulled from the print media storage unit 20 when the print media storage unit is detached. The structure of the support units 80 to selectively support the printing medium P thus serves to prevent the generation of the interference between the print media storage unit 20 and the support units 80.

Figure 3:
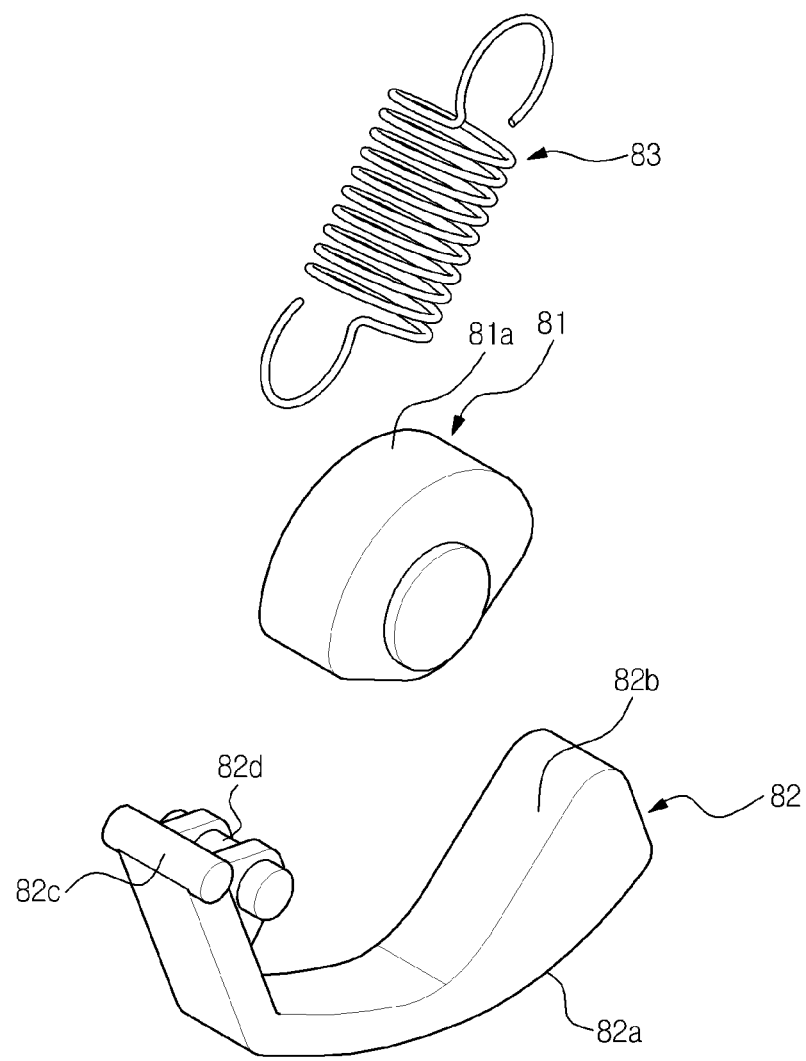
FIG. 3 is an exploded perspective view of the support unit applied to the image forming apparatus in accordance with an exemplary embodiment of the present general inventive concept.

Therefore, each of the support units 80, as illustrated in FIG. 3, includes an interlocking cam 81 installed on the pickup shaft 320 and rotated together with the rotation of the pickup shaft 320 to operate each of the support units 80 together with the operation of the pickup unit 30, a support member 82, one end of which is rotatably installed at a frame 10a forming the main body 10, to selectively support the printing medium P according to the rotating angle of the interlocking cam 81, and an elastic member 83 to elastically support the support member 82 to return the support member 82 moved by the interlocking cam 81 to an original position.

The interlocking cam 81 may have a fan-shaped cross section, and a first cam plane 81a of the interlocking cam 81, forming the outer circumferential surface of the interlocking cam 81, can be located at an angle corresponding to the pickup part 311a of the pickup roller 310. Thus, when the pickup part 311a of the pickup roller 310 contacts the printing medium P and picks up the printing medium P, the support members 82 of the support units 80 can be protruded downward by the interlocking cams 81 simultaneously with the pickup of the printing medium P, and can support both sides of the picked-up printing medium P. As illustrated in FIG. 6, the first cam plane 81a can have a radial distance Rca from the axis of rotation of the interlocking cam 81, and the surface of the first cam plane 81a may have a length spanning an angle A of the interlocking cam 81.

The support member 82 can include a support part 82a having an arc-shaped outer surface to support the printing medium P to allow the printing medium P to smoothly move, a second cam plane 82b formed on the rear surface of the support part 82a to interact with the first cam plane 81a of the interlocking cam 81, a hinge part 82c provided at one end of the support member 82 to allow the support member 82 to be rotatably installed at the frame 10a of the main body 10, and an elastic support part 82d, at which one end of the elastic member 83 having the other end installed at the frame 10a of the main body 10 is installed.

Figure 4:
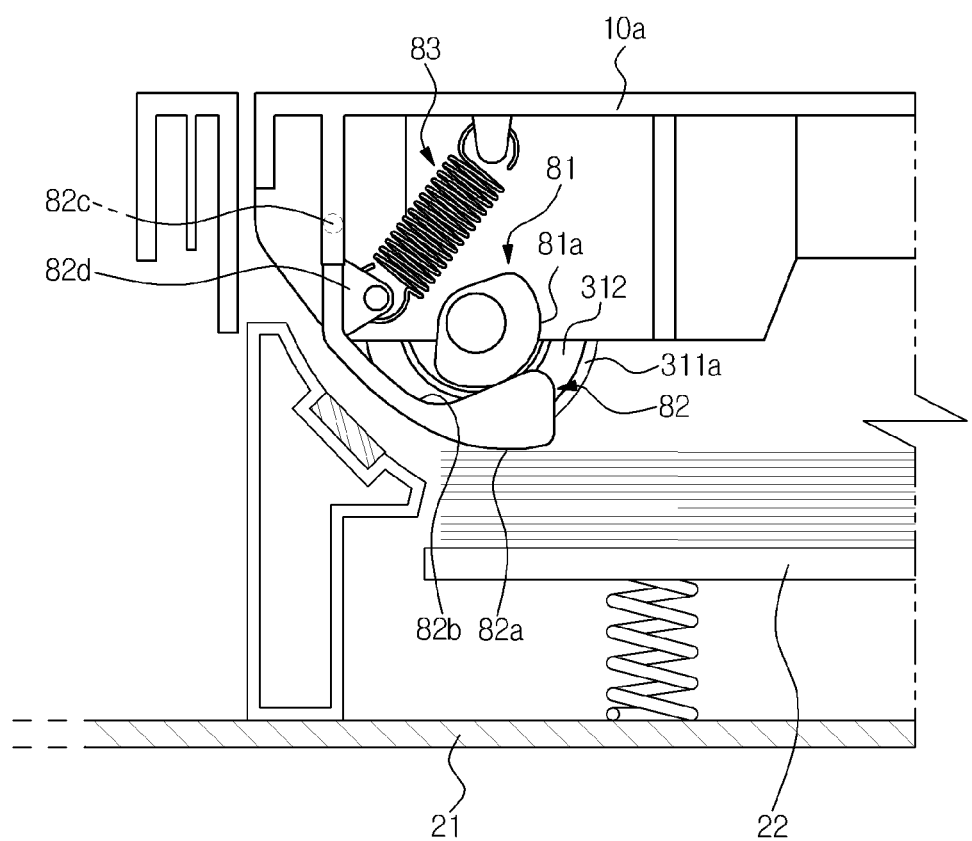
FIGS. 4 and 5 are side views illustrating the operation of the support unit applied to the image forming apparatus in accordance with an exemplary embodiment of the present general inventive concept.

Therefore, with reference to FIGS. 4, 5, 7a and 7b, when the pickup rotating body 311 of the pickup roller 310 is rotated according to the rotation of the pickup shaft 320 and the pickup part 311a of the pickup rotating body 311 contacts the printing medium P, as illustrated in FIG. 4, the interlocking cams 81, the first cam planes 81a of which are disposed at an angle corresponding to the pickup part 311a, are rotated together with the rotation of the pickup roller 310 through the pickup shaft 320. As the pickup rotating body 311 is rotated such that the pickup part 311a contacts the printing medium P to pick up the printing medium P, the interlocking cams 81 rotates with the pickup rotating body 311 so that the first cam plane 81a of the interlocking cams 81 contacts the second cam plane 82b of the support members 82. The support members 82 thus receive force from the interlocking cams 81 through the second cam planes 82b according to the rotation of the interlocking cams 81, are rotated around the hinge parts 82c provided at ends of the support members 82, and are protruded downward, thus supporting both sides of the printing medium P picked up by the pickup parts 311a. Thereby, the printing medium P enters a printing medium feeding route in the image forming apparatus 100 under the condition that the front end of the printing medium P picked up by the pickup parts 311a is flat, and thus the generation of a printing medium jam due to the deformation of the printing medium P is prevented.

Figure 5:
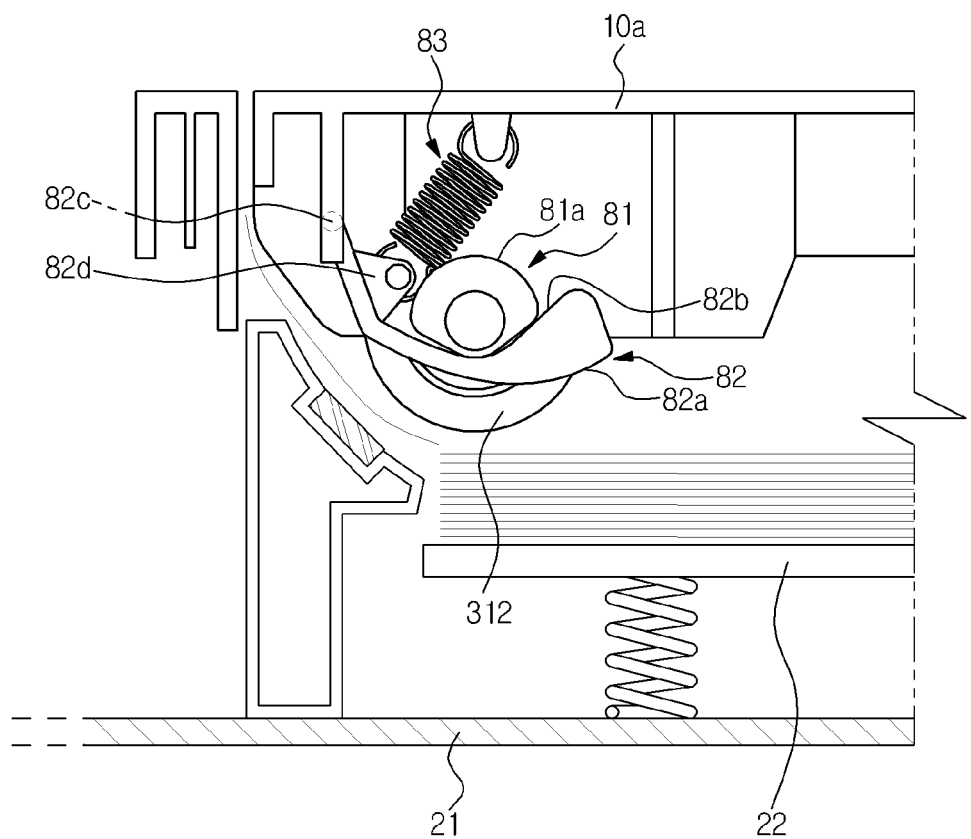

Further, after the pickup of the printing medium P has been completed, the pickup part 311a of the pickup rotating body 311 having contacted the printing medium P moves upward according to the rotation of the pickup shaft 320 and the non-pickup part 311b is rotated such that the pickup rotating body 311 does not contact the printing medium P. The first cam planes 81a of the interlocking cams 81 are rotated above the pickup shaft 320 so as to not contact the second cam planes 82b of the support members and the force applied to the support members 82 is released, as illustrated in FIG. 5. Thereby, the support members 82, having been protruded downward by the interlocking cams 81, are rotated around the hinge parts 82c provided at the ends of the support members 82 by the elastic restoring force of the elastic members 83, and thus move upward. That is, the support members 82 are protruded downward and support both sides of the printing medium P only when the pickup of the printing medium P is carried out. Under the above state that the support members 82 move upward, as described above, the support members 82 are separated from the printing medium P mounted in the knock-up plate 22. Thus, although the print media storage unit 20 is attached to or detached from the main body 10 under the above state, no interference between the print media storage unit 20 and the support units 80 is generated.

As is apparent from the above description, in the image forming apparatus in accordance with exemplary embodiments of the present general inventive concept, even though both sides of printing medium are deformed and are curled up, both sides of the printing medium are supported by the support members at the moment when the printing medium is picked up the pickup roller, and thus the front end of the picked up printing medium is momentarily flattened. Therefore, the image forming apparatus prevents jams from occurring due to the deformation of the printing medium when the printing medium is picked up.

Further, the support members of the support units are selectively protruded downward to support the printing medium only when the printing medium is picked up the pickup roller, as described above. Therefore, the image forming apparatus prevents interference between the print media storage unit and the support units generated in the process of attaching and detaching the print media storage unit to and from the main body.

Although a few exemplary embodiments of the present general inventive concept have been illustrated and described, it will be appreciated by those skilled in the art that changes may be made in these embodiments without departing from the principles and spirit of the general inventive concept, the scope of which is defined in the claims and their equivalents.

What is claimed is:

1. An image forming apparatus comprising:
a pickup roller rotated to pick up a printing medium; and
support members operated in connection with the rotation of the pickup roller to contact and support side portions of the printing medium picked up by the pickup roller.

2. The image forming apparatus according to claim 1, further comprising:
a pickup shaft to transmit a rotary force to the pickup roller; and
interlocking cams installed on the pickup shaft, rotated together with the pickup shaft, to cause the support members to selectively support the printing medium according to the rotation angle of the interlocking cams.

3. The image forming apparatus according to claim 2, wherein:
the pickup roller includes a pickup part contacting the printing medium; and
each of the interlocking cams has a fan-shaped cross section, and a first cam plane forming the outer circumferential surface of each of the interlocking cams is disposed at an angle corresponding to the pickup part.

4. The image forming apparatus according to claim 2, wherein each of the support members includes a support part having an arc-shaped outer surface to support the upper surface of the printing medium, a second cam plane formed on another surface of the support part to interact with the first cam plane of each of the interlocking cams, and a hinge part provided at one end of each of the support members to allow each of the support members to be rotated around the hinge part.

5. The image forming apparatus according to claim 2, further comprising elastic members to respectively return the support members to an original position thereof.

6. The image forming apparatus according to claim 5, wherein the support members, the interlocking cams, and the elastic members are respectively provided in a pair to support both sides of the printing medium.

7. An image forming apparatus comprising:
a pickup unit to pick up a printing medium; and
support units to selectively contact and support side portions of the printing medium picked up by the pickup unit when the printing medium is picked up by the pickup unit.

8. The image forming apparatus according to claim 7, wherein:
the pickup unit includes a pickup roller rotated to pick up the printing medium, and a pickup shaft to transmit a rotary force to the pickup roller; and
the support units are operated by the rotary force transmitted through the pickup shaft.

9. The image forming apparatus according to claim 8, wherein each of the support units includes an interlocking cam installed on the pickup shaft and rotated together with the pickup shaft, and a support member rotated around one end thereof to selectively support the printing medium according to the rotation angle of the interlocking cam.

10. The image forming apparatus according to claim 9, wherein:
the pickup roller includes a pickup part to contact the printing medium; and
the interlocking cam has a fan-shaped cross section, and a first cam plane forming the outer circumferential surface of the interlocking cam is disposed at an angle corresponding to the pickup part.

11. The image forming apparatus according to claim 9, wherein the support member includes a support part having an arc-shaped outer surface to support the upper surface of the printing medium, a second cam plane formed on another surface of the support part to interact with the first cam plane of the interlocking cam, and a hinge part provided at one end of the support member to allow the support member to be rotated around the end thereof.

12. The image forming apparatus according to claim 9, wherein each of the support units further includes an elastic member to respectively return the support member to an original position thereof.

13. The image forming apparatus according to claim 7, wherein the support members are provided in a pair to support both sides of the printing medium picked up by the pickup unit.

14. An image forming apparatus comprising:
a main body;
a print media storage unit detachably installed in the main body to store printing medium;
a pickup unit to pick up one sheet of the printing medium stored in the print media storage unit at a time; and
support units, each of which includes a support member to contact and support side portions of the printing medium, the support member being selectively protruded downward to support the printing medium at the time when the printing medium is picked up by the pickup unit.

15. The image forming apparatus according to claim 14, wherein:
the pickup unit includes a pickup roller rotated to pick up the printing medium, and a pickup shaft to transmit a rotary force to the pickup roller; and
the support units are operated by the rotary force transmitted through the pickup shaft.

16. The image forming apparatus according to claim 15, wherein each of the support units further includes an interlocking cam installed on the pickup shaft, rotated together with the pickup shaft, and causing the support member to be selectively protruded downward according to the rotation angle of the interlocking cam, and an elastic member to return the support member protruded downward to an original position thereof.

17. A support unit for use in an image forming apparatus having a pickup roller, comprising:
a support member to engage a printing medium and to apply a variable force to the printing medium according to a rotation angle of the pickup roller to prevent a jam of the printing medium.

18. The support unit of claim 17, further comprising:
an interlocking cam to rotate with the pickup roller to apply the variable force to the support member according to the rotation; and
wherein the support member comprises a support part to engage with edge portions of the printing medium.

19. The support unit of claim 18, wherein the support member has a first surface which contacts the interlocking cam and a second surface opposite the first surface to engage with the edge portions of the printing medium.

20. The support unit of claim 18, further comprising: a hinge part at one end of the support member to permit the support member to rotate about the hinge part; and
an elastic member to bias the support member to return the support member to an original position thereof.

* * * * *